(12) United States Patent
Rich

(10) Patent No.: US 12,169,097 B1
(45) Date of Patent: Dec. 17, 2024

(54) CENTRIFUGAL SAND DRYING SYSTEM AND METHOD OF USE

(71) Applicant: Thomas Jason Rich, Midland, TX (US)

(72) Inventor: Thomas Jason Rich, Midland, TX (US)

( * ) Notice: Subject to any disclaimer, the term of this patent is extended or adjusted under 35 U.S.C. 154(b) by 14 days.

(21) Appl. No.: 17/582,909

(22) Filed: Jan. 24, 2022

Related U.S. Application Data

(60) Provisional application No. 63/190,671, filed on May 19, 2021.

(51) Int. Cl.
  *F26B 5/08* (2006.01)
  *B01D 21/24* (2006.01)
  *B01D 21/26* (2006.01)

(52) U.S. Cl.
  CPC ............ *F26B 5/08* (2013.01); *B01D 21/2461* (2013.01); *B01D 21/2488* (2013.01); *B01D 21/262* (2013.01); *F26B 2200/14* (2013.01)

(58) Field of Classification Search
  None
  See application file for complete search history.

(56) References Cited

U.S. PATENT DOCUMENTS

| | | | | | |
|---|---|---|---|---|---|
| 3,161,581 | A | * | 12/1964 | Tiedje | C10G 1/047 494/37 |
| 4,110,194 | A | * | 8/1978 | Peterson | C10G 1/047 196/14.52 |
| 4,120,775 | A | * | 10/1978 | Murray | B03B 9/02 196/14.52 |
| 4,416,764 | A | * | 11/1983 | Gikis | B01D 11/0226 210/801 |
| 4,532,024 | A | * | 7/1985 | Haschke | C10G 1/04 203/68 |
| 4,875,998 | A | * | 10/1989 | Rendall | C10G 1/047 208/89 |
| 5,492,628 | A | * | 2/1996 | Schutte | B09B 1/00 210/710 |
| 2007/0205141 | A1 | * | 9/2007 | Freeman | C10G 1/047 208/390 |

* cited by examiner

*Primary Examiner* — Krishnan S Menon
(74) *Attorney, Agent, or Firm* — Richard Eldredge; Leavitt Eldredge Law Firm

(57) ABSTRACT

A centrifugal sand drying system improves the removal of sand from liquid through the inclusion of a centrifugal separator with a hopper and screw. The mixture of sand and liquid is directed in a continuous feed to the centrifugal separator where it rotates to isolate the sand from the liquid. The liquid then returns to the hopper while the sand is directed to the screw where it is extracted from the system.

2 Claims, 3 Drawing Sheets

CENTRIFUGAL SAND DRYING SYSTEM AND METHOD OF USE

1. Field of the Invention

The present invention relates generally to sand, water, and gas separators and methods of use and more particularly to a centrifugal sand drying system that limits, spins sand that has been separated to further remove moisture or otherwise separate the sand from any contaminated found therein.

2. Description of Related Art

Gas and sand separators are configured to remove sand from water are well known in the art and are effective means to remove sand and/or other debris from a liquid. For example, FIG. 1 illustrates a front view of a conventional separator 101 having a housing 103 configured to receive a mix of sand and water 105 therein. An auger screw 107 is partially disposed within the sand and water mix and has a plurality of blades 111 configured to traverse the sand and water mix along an inclined section 109 of housing 103. During use, the auger screw 107 rotates, which in turn causes an upward angled movement of the sand and water mix along the inclined section 109. The water gradually recedes along the inclined section while the sand and/or other forms of debris exits from housing 103 via auger screw 107.

Any fluid that remains in the sand after separation must be contained and treated to prevent damage to the environment so that the removal of the most fluid possible is safe, desirable, and cost-efficient.

Accordingly, although great strides have been made in the area of separator systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
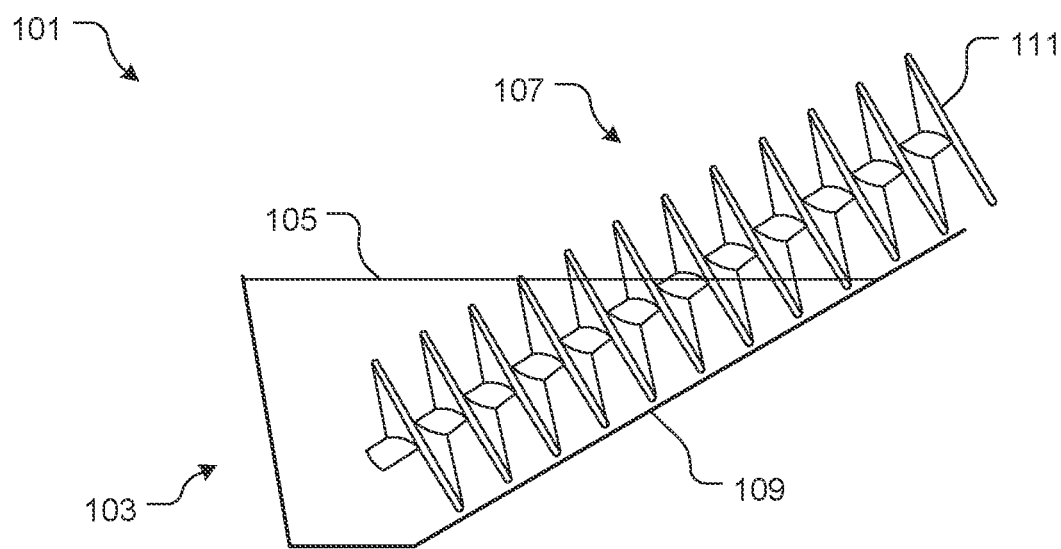
FIG. 1 is a side view of a conventional separator.

While the centrifugal sand drying system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the separator system and method of use of the present application are provided below. It will of course be appreciated that in the development of any actual embodiment, numerous implementation-specific decisions will be made to achieve the developer's specific goals, such as compliance with separator system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The centrifugal sand drying system and its method of use will be understood, both as to its structure and operation, from the accompanying drawings, taken in conjunction with the accompanying description. Several embodiments of the centrifugal sand drying system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
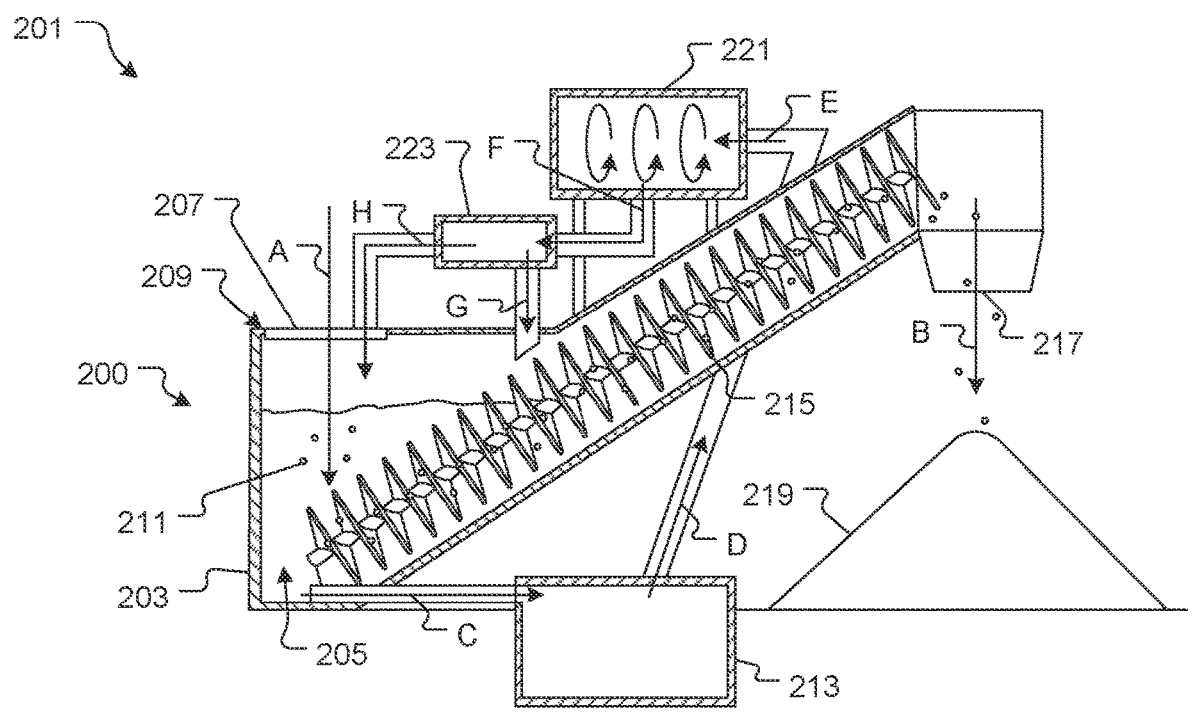
FIG. 2 is a side view of a centrifugal sand drying system in accordance with a preferred embodiment of the present application.

Referring now to the drawings wherein like reference characters identify corresponding or similar elements throughout the several views, FIG. 2 depicts a cross-sectional side view of the centrifugal sand drying system 201 in accordance with a preferred embodiment of the present application. It will be appreciated that the system 201 overcomes one or more of the above-listed problems commonly associated with the conventional separators. A detailed explanation of these differences and unique features of the system 201 are discussed below with reference to the accompanying drawings.

System 201 includes a portable hopper 200 having a body 203 that encloses a space 205. An opening 207 passes through the top surface 209 of the body 203. The opening 207 allows a mixture of sand 211 and liquid to enter the space 205 as depicted by motion A. A screw 215 pulls the mixture from the hopper 200 to an exit 217 where the sand is separated and collects in a pile 219 as depicted by motion B. Liquid and sand 211 are also pulled to a secondary reservoir 213 as depicted by motion C that is in fluid communication with the hopper 200. Liquid and sand 211 from this secondary reservoir 213 travel to a centrifugal separator 221 that is in fluid communication therewith as depicted by motions D and E. The centrifugal separator 221 rotates the liquid and sand 211 from the secondary reservoir 213 so that the sand and liquid are parted. They exit therefrom as depicted by motion F, separately, and pass through a director 223 that sends the sand to the screw 215 as depicted by motion G and the fluid to the hopper 200 as depicted by motion H respectively.

In use, the mixture of sand 211 passes through the hopper to the screw that compacts the sand and forces the fluid out of it. The fluid is collected from the space 205 while the sand 211 leaves through the exit 217. The centrifugal separator 221 further dries the sand and forces the liquid to leave it. In this way, dry sand 211 leaves the system and thus reduces the need to process or collect any fluid the leaves with the sand 211.

One of the unique features believed characteristic of the present application is that the centrifugal separator 221 assists the screw 215 to remove liquid from the sand. Where the centrifugal separator 221 rotates the mixture so that the liquid is forced from the sand by the rotation thereof.

Figure 3:
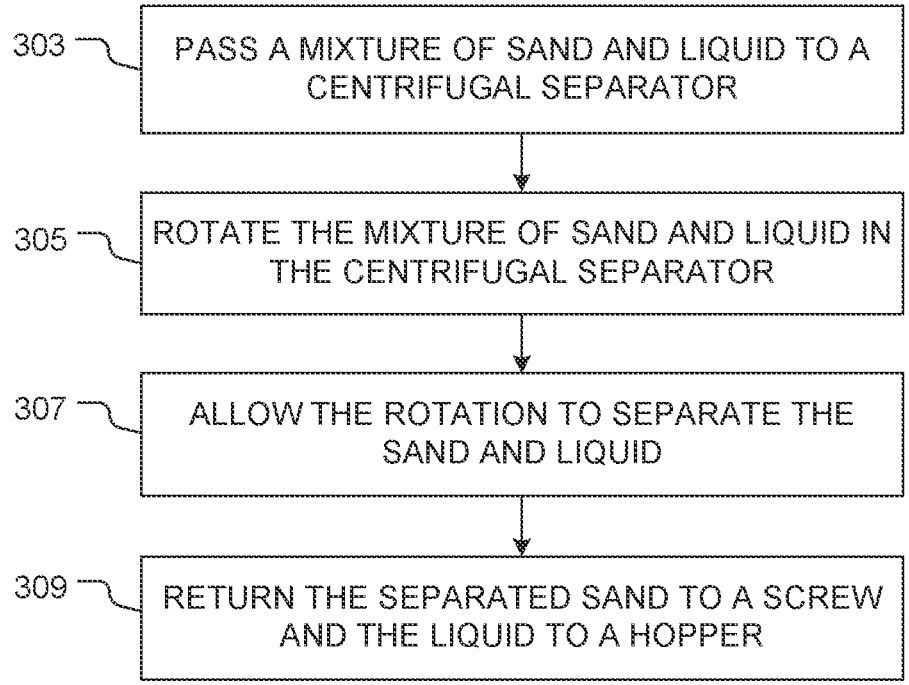
FIG. 3 is a flowchart of a method of removing sand from a liquid.

Referring now to FIG. 3 a method of removing sand from a liquid mixture is depicted. Method 301 includes passing a mixture of sand and liquid to a centrifugal separator 303, rotating the mixture of sand and liquid in the centrifugal separator 305, allowing the rotation to separate the sand and liquid 307, and returning the separated sand to a screw and the liquid to a hopper 309.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A centrifugal sand drying system comprising:
   a body that encloses and forms a space;
   a secondary reservoir in communication with the body;
   a screw attached to the body and in communication with the space and configured to move and separate the contents from the space, wherein the contents includes water and sand; and
   a centrifugal separator attached to the body and in fluid communication with the the secondary reservoir;
   wherein the centrifugal separator receives the contents from the secondary reservoir and separates the sand from the water within the contents and channels the sand back to the space, which in turn is received by the screw; and
   wherein the sand is deposited in a pile outside the body via the screw.

2. The system of claim 1 wherein the separated liquid returns to the space and the separated sand is directed to the screw.

* * * * *